(12) United States Patent
Ganasan

(10) Patent No.: US 7,174,403 B2
(45) Date of Patent: Feb. 6, 2007

(54) PLURAL BUS ARBITRATIONS PER CYCLE VIA HIGHER-FREQUENCY ARBITER

(75) Inventor: Jaya Prakash Subramaniam Ganasan, Youngsville, NC (US)

(73) Assignee: Qualcomm Incorporated, San Diego, CA (US)

( * ) Notice: Subject to any disclaimer, the term of this patent is extended or adjusted under 35 U.S.C. 154(b) by 107 days.

(21) Appl. No.: 11/066,507

(22) Filed: Feb. 24, 2005

(65) Prior Publication Data
US 2006/0190649 A1 Aug. 24, 2006

(51) Int. Cl.
G06F 13/14 (2006.01)
G06F 13/36 (2006.01)
G06F 1/10 (2006.01)

(52) U.S. Cl. ............ 710/113; 710/107; 713/501; 370/462

(58) Field of Classification Search ........ 710/113, 710/107, 110, 36, 240, 241, 309; 713/501, 713/600; 370/462, 360
See application file for complete search history.

(56) References Cited

U.S. PATENT DOCUMENTS

| | | | | |
|---|---|---|---|---|
| 4,620,278 | A | * | 10/1986 | Ellsworth et al. ............ 710/119 |
| 5,604,735 | A | * | 2/1997 | Levinson et al. ............ 370/360 |
| 5,898,847 | A | * | 4/1999 | Yoon ............................ 710/113 |
| 5,933,610 | A | * | 8/1999 | Chambers et al. ........... 711/113 |
| 6,519,666 | B1 | * | 2/2003 | Azevedo et al. ............. 710/120 |
| 6,651,148 | B2 | * | 11/2003 | Widdup ........................ 711/158 |
| 6,948,017 | B2 | * | 9/2005 | Carpenter et al. ........... 710/107 |
| 2002/0019911 | A1 | * | 2/2002 | Widdup ........................ 711/130 |
| 2004/0083326 | A1 | | 4/2004 | Wang et al. |
| 2005/0027920 | A1 | | 2/2005 | Fitzsimmons et al. |
| 2006/0112205 | A1 | * | 5/2006 | Chang et al. ................ 710/110 |

OTHER PUBLICATIONS

"Managing the real-time behaviour of a particle beam factory: the CERN Proton Synchrotron complex and its timing system principles" by Bau et al. (abstract only) Publication date: Aug. 1998.*

* cited by examiner

Primary Examiner—Gopal C. Ray
(74) Attorney, Agent, or Firm—Philip R. Wadsworth; Charles D. Brown; Nicholas J. Pauley

(57) ABSTRACT

An arbiter in a bus system arbitrates multiple bus transaction requests in a single bus frequency clock cycle, by operating at a frequency greater than the bus frequency. This allows for two or more arbitration operations in a single bus frequency clock cycle with one instance of arbitration logic. The arbiter may arbitrate for two or more slave devices, or may arbitrate multiple master device requests directed to the same slave device. The arbiter frequency may be variable, and may be predicted based on, e.g., prior bus activity. If only one bus transaction request is pending, the arbiter frequency may equal the bus frequency. The results of an earlier arbitration decision may be utilized to more intelligently make subsequent arbitration decisions in the same bus frequency clock cycle.

17 Claims, 3 Drawing Sheets

PLURAL BUS ARBITRATIONS PER CYCLE VIA HIGHER-FREQUENCY ARBITER

BACKGROUND

The present invention relates generally to the field of electronic data processing and in particular to a system and method of high performance bus arbitration.

The transfer of data between functional units is a common operation of computer systems. Transferring a program from disk to memory to a processor; sending data from a graphics engine to a frame buffer to a video card; and sending input from a keyboard or mouse to a processor are all common examples of data transfer within a computer system.

FIG. 1 depicts a simplified diagram of a system bus architecture, indicated generally by the numeral 10. A system bus 12, which may be divided into an address channel, data channel, control channel and the like, interconnects system units. Master devices, such as the CPU 14 or a DMA engine 16, initiate data transfers across the bus 12—referred to herein as bus transactions—to or from slave devices, such as memory 18 and input/output circuits 20. When two or more independent masters 14, 16 are connected to the bus 12, their access to the bus is controlled by an arbiter 22.

As known in the art, one or more master devices 14, 16 assert a bus request to the arbiter 22. The arbiter 22 monitors activity on the bus 12, and when the bus 12 becomes available, sends a bus grant to one of the requesting master devices 14, 16. The granted master device 14, 16 may then initiate transactions across the bus 12, such as read or write cycles directed to one or more slave devices 18, 20.

While the system bus 10 works well for connecting a few master devices 14, 16 with a variety of slave devices 18, 20, it imposes a limitation that only one master device 14, 16 can access a slave device 18, 20 at one time. In high performance processors, it is often the case that two or more master devices 14, 16 may wish to independently access one or more slave devices 18, 20.

FIG. 2 depicts a high performance data transfer system, indicated generally by the numeral 30. A switch matrix 32, also known as a crossbar switch, interconnects a plurality of master devices 34 to a plurality of slave devices 36, in the most general case with any master device having access to any slave device. For example, FIG. 2 depicts Master 1 accessing Slave 1, and simultaneously, Master 2 accessing Slave 0. In some implementations, one or more of the slave devices 36 may include two or more address busses, allowing simultaneous access by more than one master device 34.

For a bus system 30 comprising n master devices 34 and a single slave device 36, only one arbiter is necessary within the switch matrix 32 to arbitrate competing accesses to the slave device 36. For an n×m crossbar system 30, with n masters 34 and m slaves 36, from one to m arbiters may be implemented. The highest performance will be achieved with m arbiters, with each arbiter dedicated to a slave device 36. With fewer than m arbiters—that is, with at least one arbiter performing arbitration for two or more slave devices 36—performance will degrade, as each arbiter can only arbitrate for one slave device 36 at a time, or within any given bus cycle. However, instantiating many arbiters consumes chip area, complicates routing, and increases power consumption.

SUMMARY

According to one or more embodiments, an arbiter in a bus arbitrates multiple bus transaction requests in a single bus frequency clock cycle, by operating at an arbiter frequency greater than the bus frequency.

In one embodiment, a system includes a bus operating at a bus frequency. At least one master device is connected to the bus and requesting bus transactions. At least one slave device is connected to the bus and engaging in bus transactions. An arbiter arbitrates more than one transaction request in a single bus frequency clock cycle by operating at an arbiter frequency greater than the bus frequency.

In another embodiment, a method of arbitrating multiple bus transaction requests in a bus operating at a bus frequency comprises operating an arbiter at an arbiter frequency greater than the bus frequency, and arbitrating multiple bus transaction requests in one bus frequency clock cycle.

DETAILED DESCRIPTION

Figure 1:
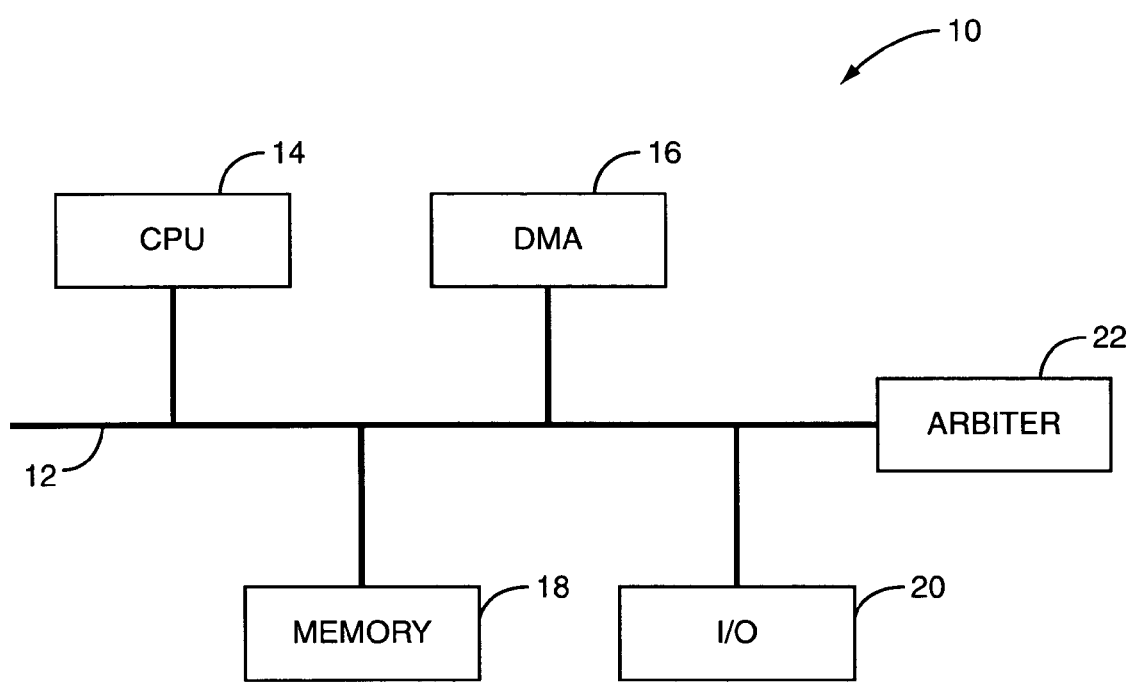
FIG. 1 is a functional block diagram of a prior art computer bus.
Figure 2:
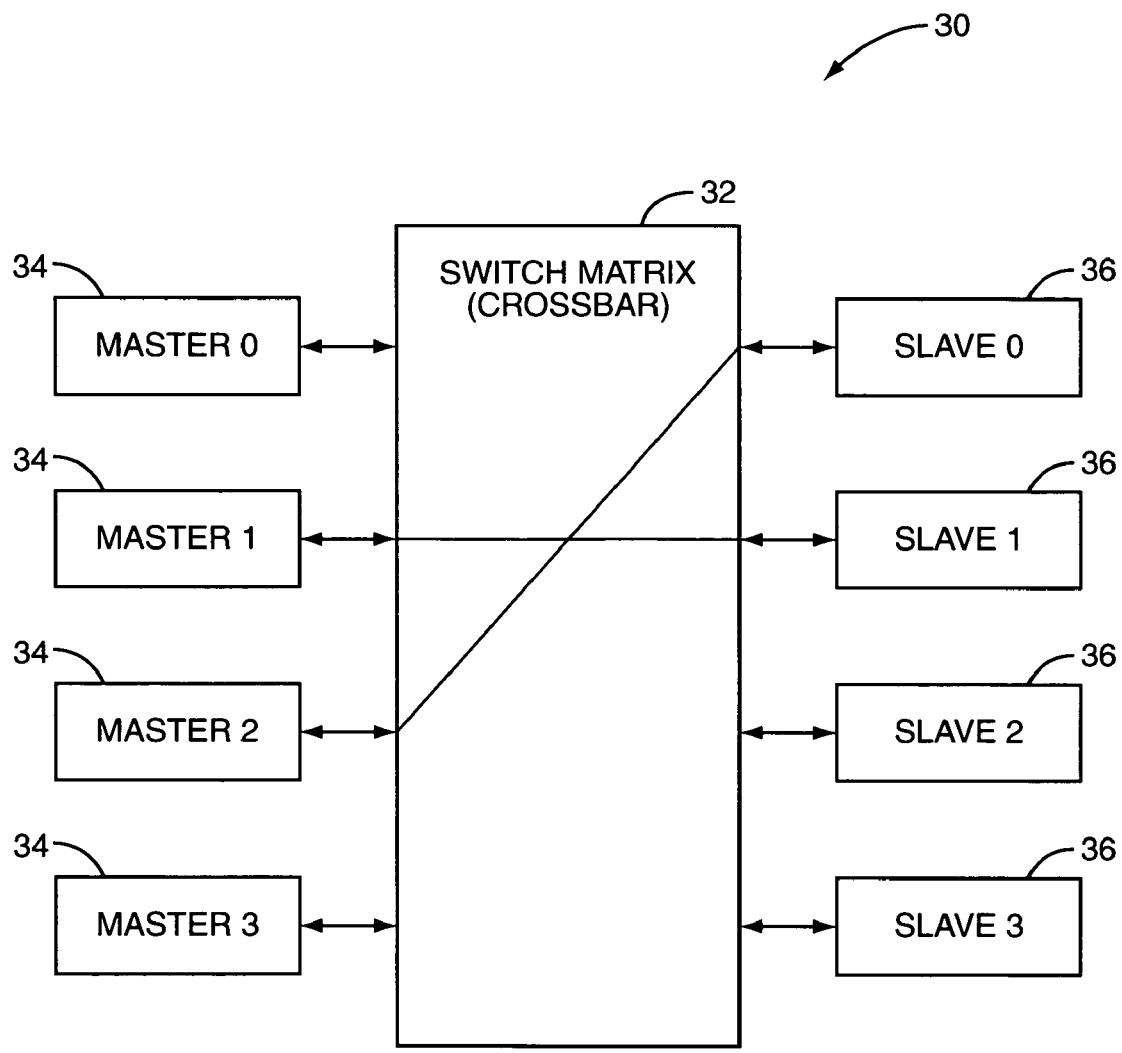
FIG. 2 is a functional block diagram of a crossbar bus.
Figure 3:
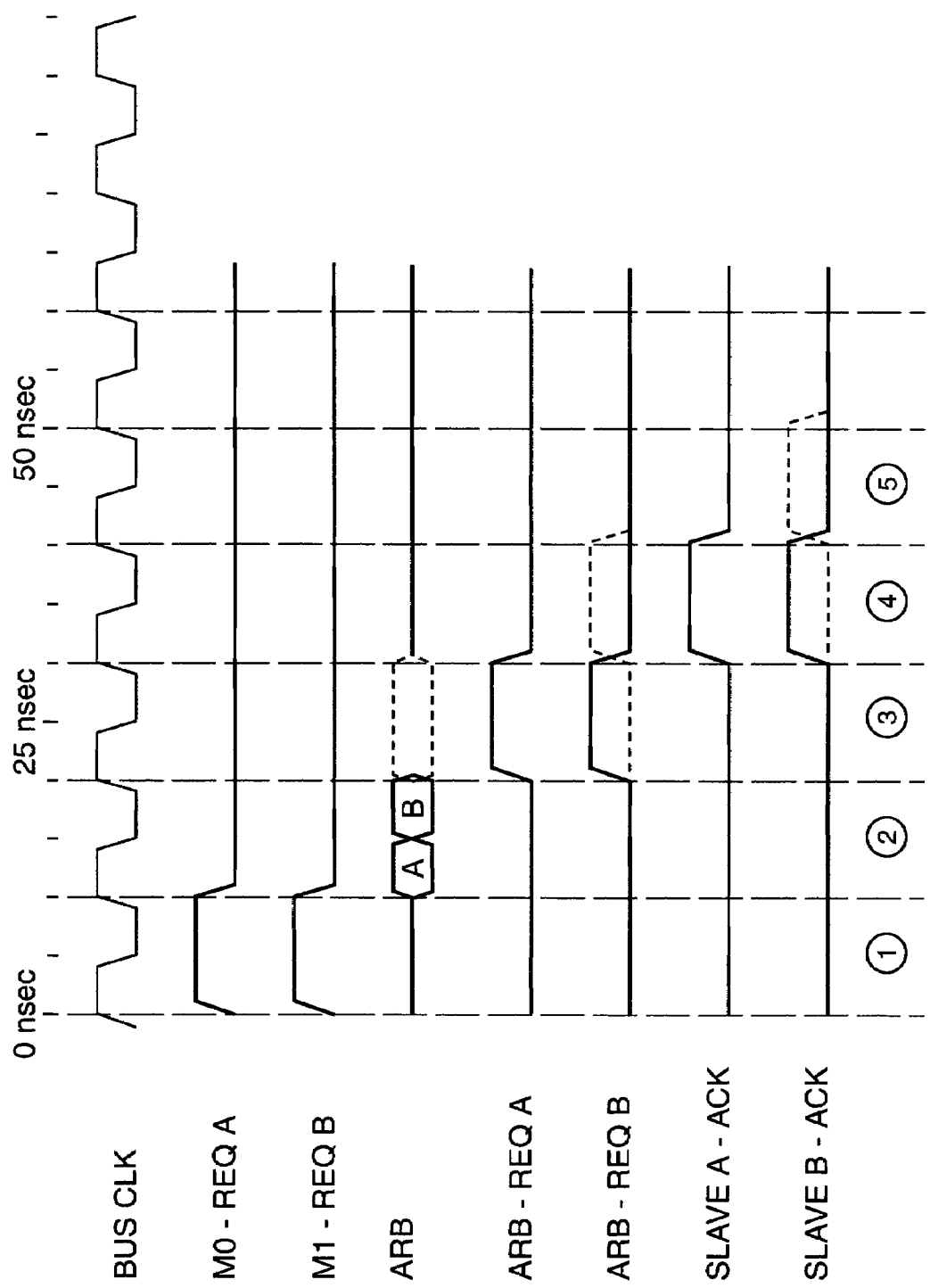
FIG. 3 is a timing diagram of a crossbar bus arbitration cycle.

FIG. 3 depicts a timing diagram of representative bus transaction requests and arbitration in a cross-matrix system 30. In this example, the bus operates at a bus frequency of 100 MHz, with a 10 nsec clock cycle, and two slave devices A and B share a single arbiter. Two master devices M0, M1 simultaneously issue requests for bus transactions directed to two slave devices, A and B, in bus cycle 1.

In a system 30 having a conventional arbiter, arbitration would proceed for slave device A in bus cycle 2, and for slave device B in bus cycle 3 as indicated by dotted lines. The arbiter would issue a request to slave device A in bus cycle 3 and to slave device B in bus cycle 4 as indicated by dotted lines. The slave devices would acknowledge in bus cycles 4 and 5 respectively, and the master devices M0 and M1 may proceed with the bus transaction upon receiving each respective slave acknowledgement.

In one or more embodiments, multiple arbitration cycles are performed in one bus frequency clock cycle by operating the arbiter at an arbiter frequency higher than the bus frequency. As depicted in the solid-line signals of FIG. 3, the arbiter performs arbitration for both slave device A and B in bus cycle 2, by running (in this embodiment) at an arbiter frequency twice the bus frequency. Thus, the arbiter is able to issue requests to both slave devices A and B in bus cycle 3, and both slave devices A and B may acknowledge in bus cycle 4. Both M0 and M1 may begin bus transactions in bus cycle 5, which in the case of M1 is a full cycle earlier than the case described above, and depicted in FIG. 3 in dotted lines, where the arbiter operates at the bus frequency. Similarly, by running the arbiter at 3×, 4× or other multiple of the bus frequency, requests directed to three, four or more slaves may be arbitrated in a single bus frequency clock cycle, allowing the respective bus transactions to proceed in parallel.

In these embodiments, a single instance of an arbiter may arbitrate multiple bus transaction requests for multiple slaves in parallel, without requiring duplicate instances of the arbitration logic. As used herein, a single instance of an arbiter comprises the logic and configuration information necessary to perform arbitration of one or more bus transaction requests directed to a slave device 36. By operating an arbiter at an arbiter frequency higher than the bus frequency, multiple bus transaction requests may be arbitrated in a single bus frequency clock cycle, using only one instance of the arbitration logic, as opposed to duplicating the arbitration logic for each slave device 36. This conserves silicon area, reduces routing complexity and conserves power, at the cost of generating and routing at least two clock signals of different frequencies.

In most embodiments, the arbiter frequency will be some multiple of the bus frequency, although not necessarily a $2^n$ multiple (e.g., the arbiter frequency may be 3× or 5× the bus frequency). This allows the maximum time to be devoted to each arbitration operation. However, the arbiter frequency being a precise multiple of the bus frequency is not a limitation of embodiments disclosed herein. In general, the arbiter frequency may simply be sufficiently greater than the bus frequency to allow at least two bus transaction requests to be arbitrated in a single bus frequency clock cycle.

The timing diagram of FIG. 3 depicts two master devices M0, M1 simultaneously requesting bus transactions directed toward two different slave devices 36 sharing a single inventive arbiter. The same timing relationship occurs if a single master device 34 simultaneously request bus transactions directed toward two different slave devices 36 sharing an arbiter. For example, the master device 34 may direct a read transaction to one slave device 36 and a write transaction to the other. Alternatively, the master device 34 may know that the slave devices 36 have different response latencies, and that simultaneous requests for similar bus transactions will not cause bus collisions when the transactions occur.

In another embodiment, two or more master devices 34 may simultaneously request bus transactions directed to the same slave device 36. If the slave device 36 has sufficient address bus capacity, it may be able to engage in two or more bus transactions contemporaneously. An example of high address bus capacity is a shared-channel bus structure. To conserve silicon area and reduce routing complexity, the address channel functionality of a bus 30 may be merged with a data transfer channel. For example, the address bus may share a channel with the write data bus. If the system has a 32-bit real (hardware) address space and a 128-bit write data bus, multiplexing address and write data functionality onto a single, 128-bit bus channel allows up to four separate addresses to be transferred during one address transfer cycle. In this case, up to four master devices 34 (or fewer, if one or more master devices 34 issues plural bus requests) may request bus transactions and issue addresses during the same cycle, with two or more of the addresses directed to the same slave device 36. If the slave device 36 has the capability, it may accept all requests and engage in multiple simultaneous bus transactions. In this embodiment, a single arbiter may arbitrate multiple bus transaction requests all directed to the same slave device 36, in a single bus frequency clock cycle, by operating at an arbiter frequency greater than the bus frequency.

In one or more embodiments, the arbiter frequency may be variable. When only one bus transaction request is outstanding, the arbiter frequency may equal the bus frequency. In this embodiment, the arbiter resembles a conventional arbiter, performing one arbitration per bus frequency clock cycle. This conserves power over operating the arbiter at a higher frequency than the bus, when doing so provides no performance benefit.

In one embodiment, the arbiter frequency is predicted. The prediction may be based, for example on recent past bus activity. During periods when one or more master devices 34 are issuing multiple bus transaction requests, the arbiter frequency may be increased against the possibility of multiple arbitrations (whether from different master devices 34 to the same slave device 36 or to different slave devices 36 that share an arbiter). For example, in one embodiment the number of bus transaction requests pending during the previous n bus cycles may be stored, and examined to predict an arbitration frequency for one or more following bus cycles. In another embodiment, the fact of multiple pending bus transaction requests may increment a saturation counter, as well known in processor branch prediction implementations. Extended periods of no multiple pending bus transaction requests may decrement the counter. The MSB of the counter may be used as a prediction of whether a higher arbiter frequency is should be employed. Those of skill in the art will recognize that a broad variety of techniques may be employed to predict arbiter frequency.

In one embodiment, the arbiter may take advantage of the serial nature of sequential arbitrations to increase the "intelligence" of subsequent arbitrations by considering the results of previous arbitrations. For example, if a first arbitration operation grants a write request from a master device 34 to a slave device 36, a subsequent arbitration performed during the same bus frequency clock cycle may decline to grant a write request to the same slave device 36 from another master device 34 that it otherwise would have granted, to preclude a write data collision at the slave device 36.

In one embodiment, the arbiter may include a pending bus state register, for example allocating a bit to each possible combination of read and write transaction from each master device 34 to each slave device 36. Early arbitration decisions by the arbiter may set the relevant pending bus state bits, and logic in the arbiter may utilize the results of these arbitration decisions—e.g., the updated pending bus state—to more intelligently make subsequent arbitration decisions within the same bus frequency clock cycle. This may result in higher performance (beyond the performance improvement of multiple arbitrations per bus frequency clock cycle) by optimizing bus traffic and avoiding collisions and bottlenecks.

Performing multiple bus transaction request arbitrations in a single bus frequency clock cycle by running the arbiter at an arbiter frequency higher than the bus frequency increases performance by allowing parallel arbitration, without the cost of multiple instances of arbiter logic. The serial nature of the multiple arbitrations allows for more intelligent arbitration decisions, as later arbitration operations have the results of prior arbitration decisions as inputs. To conserve power, the arbitration frequency may be throttled back to the bus frequency when multiple requests are not outstanding. To balance power conservation during low bus utilization and improved performance during heavy bus utilization, the arbiter frequency may be predicted.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A system, comprising:
   a bus operating at a bus frequency;

at least one master device connected to the bus and requesting bus transactions;

at least one slave device connected to the bus and engaging in bus transactions; and an arbiter arbitrating more than one transaction request in a single bus frequency clock cycle by operating at an arbiter frequency greater than the bus frequency.

2. The system of claim 1 wherein the arbiter comprises a single instantiation of arbitration logic.

3. The system of claim 1 wherein the arbiter frequency is a multiple of the bus frequency.

4. The system of claim 1 wherein:

the slave device includes at least at least two address paths;

two master devices simultaneously request bus transactions to the slave device; and the arbiter issues grants to both master devices in a single bus frequency clock cycle.

5. The system of claim 1 wherein:

the master device simultaneously requests bus transactions to two slave devices; and the arbiter issues grants to the master device for both slave devices in a single bus frequency clock cycle.

6. The system of claim 1 wherein, if not more than one bus transaction request is asserted, the arbiter frequency is equal to the bus frequency.

7. The system of claim 1 wherein the arbiter frequency is predicted in response to bus transaction request activity.

8. The system of claim 1 wherein the arbiter sequentially arbitrates at least a first and second bus transaction request in a single bus frequency clock cycle, and wherein arbitration of the second request includes the result of the arbitration of the first request.

9. The system of claim 8 wherein the arbiter maintains the state of pending bus transactions.

10. A method of arbitrating multiple bus transaction requests in a bus operating at a bus frequency, comprising:

operating an arbiter at an arbiter frequency greater than the bus frequency; and arbitrating multiple bus transaction requests in one bus frequency clock cycle.

11. The method of claim 10 wherein the arbiter frequency is a multiple of the bus frequency.

12. The method of claim 11 wherein the arbiter arbitrates a bus transaction request in each arbiter frequency clock cycle.

13. The method of claim 12 wherein the arbiter sequentially arbitrates at least a first and second bus transaction request in a single bus frequency clock cycle, and wherein arbitration of the second request includes the result of the arbitration of the first request.

14. The method of claim 13 wherein the arbiter maintains the state of pending bus transactions.

15. The method of claim 10 wherein the arbiter frequency is variable.

16. The method of claim 15 wherein the arbiter frequency is predicted based on bus activity.

17. The method of claim 10 wherein if only one bus request is pending, the arbiter frequency equals the bus frequency.

* * * * *